United States Patent [19]

Kitao et al.

[11] Patent Number: 4,833,876

[45] Date of Patent: May 30, 1989

[54] CARRIER FOR CABLES AND THE LIKE

[75] Inventors: Nobuo Kitao; Yoshimasa Shimomura, both of Osaka, Japan

[73] Assignee: Tsubakimoto Chain Co., Osaka, Japan

[21] Appl. No.: 178,544

[22] Filed: Apr. 7, 1988

[30] Foreign Application Priority Data

| Apr. 9, 1987 [JP] | Japan | 62-85667 |
| Oct. 9, 1987 [JP] | Japan | 62-154132[U] |
| Oct. 9, 1987 [JP] | Japan | 62-154133[U] |
| Oct. 9, 1987 [JP] | Japan | 62-154134[U] |
| Dec. 25, 1987 [JP] | Japan | 62-195934[U] |

[51] Int. Cl.$^4$ ............................................. F16G 13/16
[52] U.S. Cl. ...................................... 59/78.1; 59/900; 248/49
[58] Field of Search .................. 59/78, 78.1, 900; 248/48, 50, 51, 49, 78

[56] References Cited

U.S. PATENT DOCUMENTS

| 3,779,003 | 12/1973 | Boissevain et al. | 59/78.1 |
| 4,570,437 | 2/1986 | Moritz | 59/78.1 |
| 4,590,961 | 5/1986 | Schumann | 59/78.1 |
| 4,625,507 | 12/1986 | Moritz et al. | 59/78.1 |
| 4,658,577 | 4/1987 | Klein | 59/78.1 |
| 4,769,985 | 9/1988 | Moritz | 59/78.1 |
| 4,800,714 | 1/1989 | Moritz | 59/78.1 |

FOREIGN PATENT DOCUMENTS

| 3531066 | 3/1987 | Fed. Rep. of Germany | 59/78.1 |
| 3613431 | 10/1987 | Fed. Rep. of Germany | 59/78.1 |
| 56-159914 | 9/1981 | Japan | 59/78.1 |

Primary Examiner—David Jones
Attorney, Agent, or Firm—Dann, Dorfman, Herrell and Skillman

[57] ABSTRACT

A cable drag chain having a large number of flexibly connected link units each with a pair of opposingly spaced link plates having upper and lower sides thereof connected to each other by coupling bars to provide a hollow rectangular structure forming a closed channel for threadedly accommodating therein cables, hoses or like flexible conduits, which may be used to supply power to a movable piece of equipment. The link units are disengageably coupled with each other and the components of each unit also detachably coupled together to permit disassembly and reassembly in the field.

26 Claims, 20 Drawing Sheets

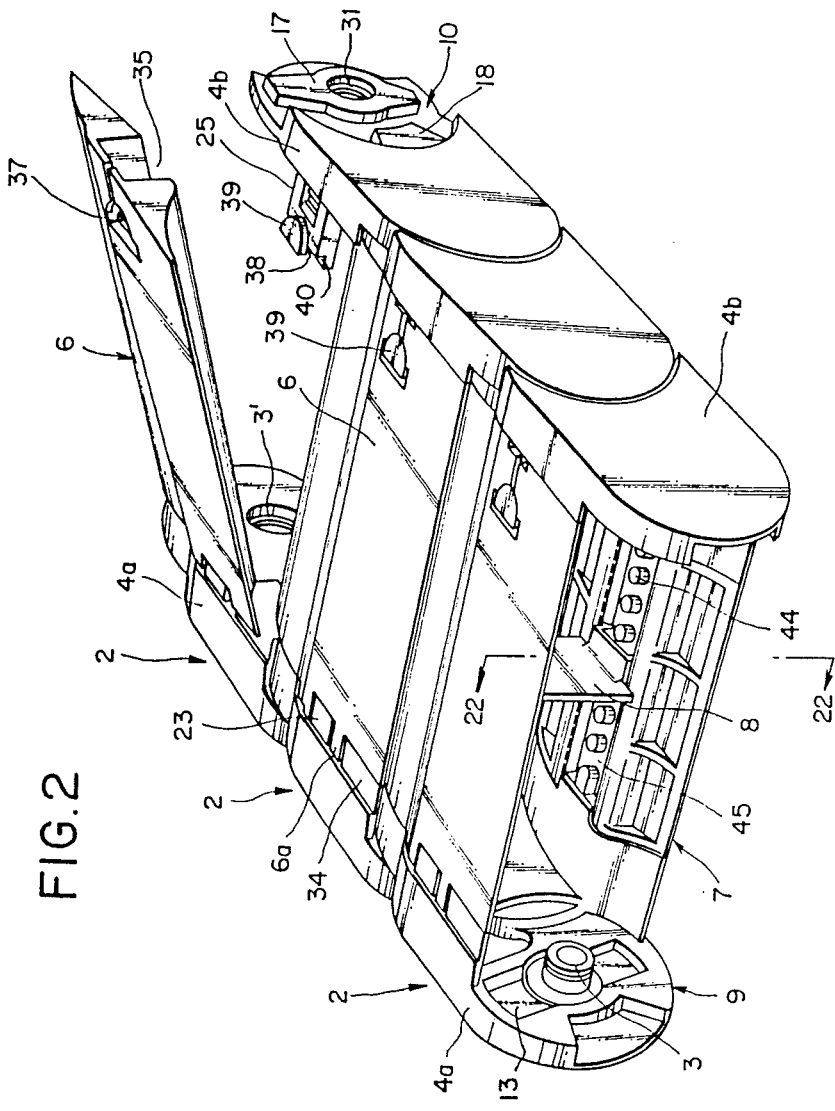

FIG. 3(a)
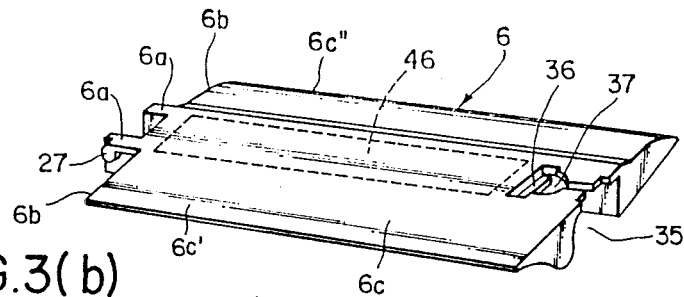
FIG. 3(b) FIG. 3(c)
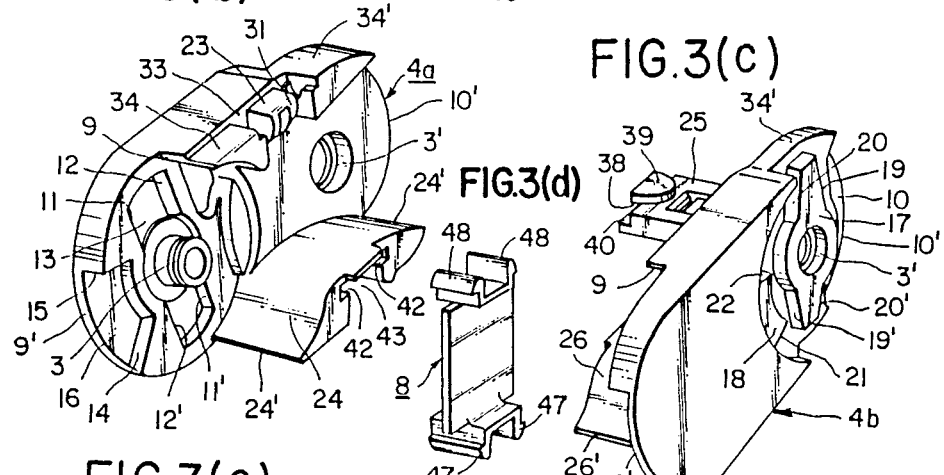
FIG. 3(d)
FIG. 3(e)
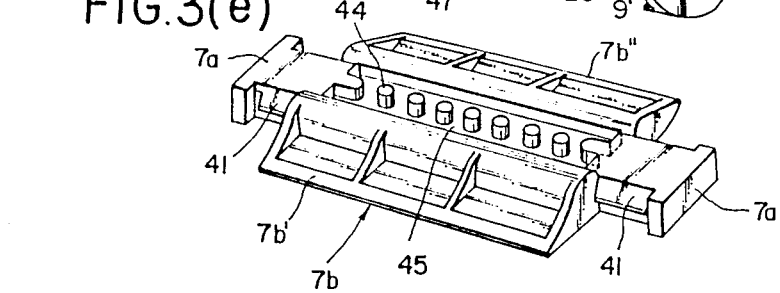

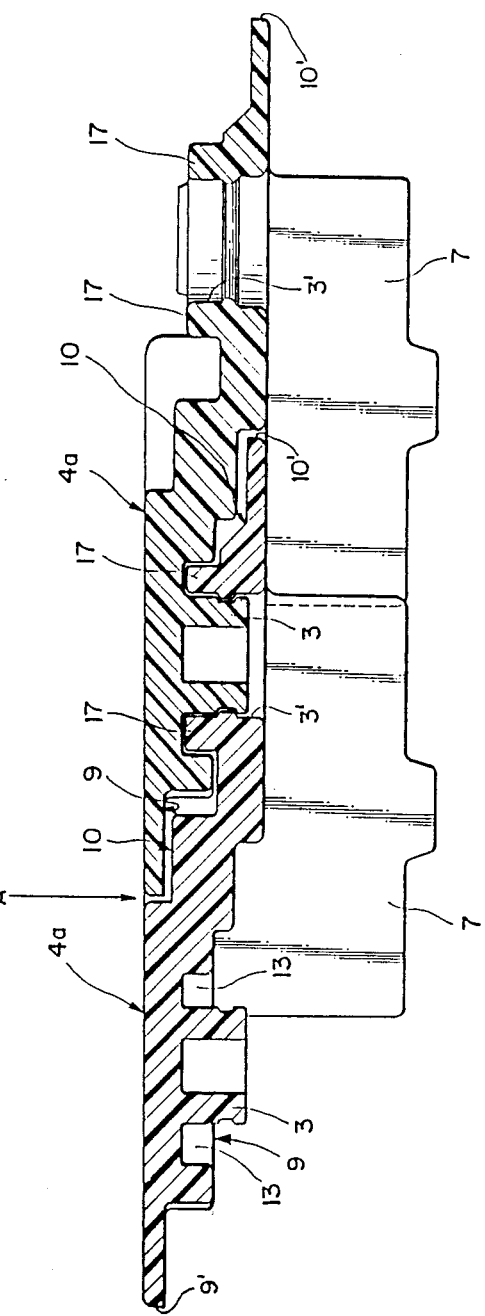

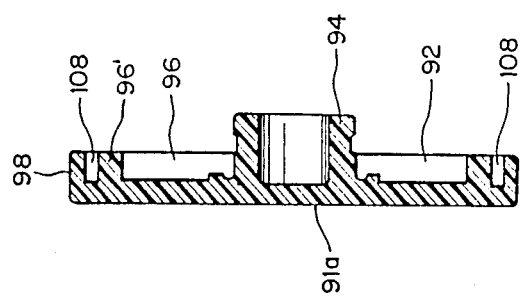
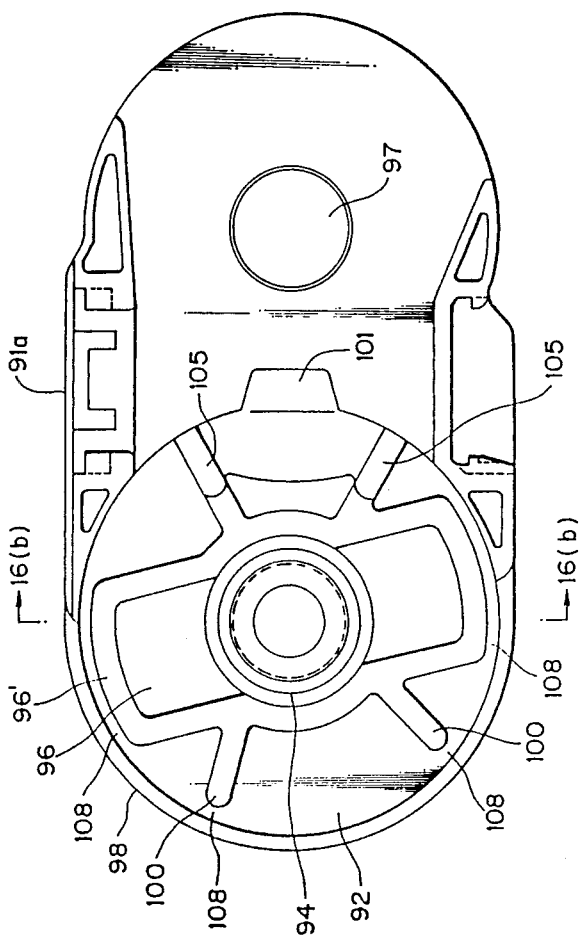

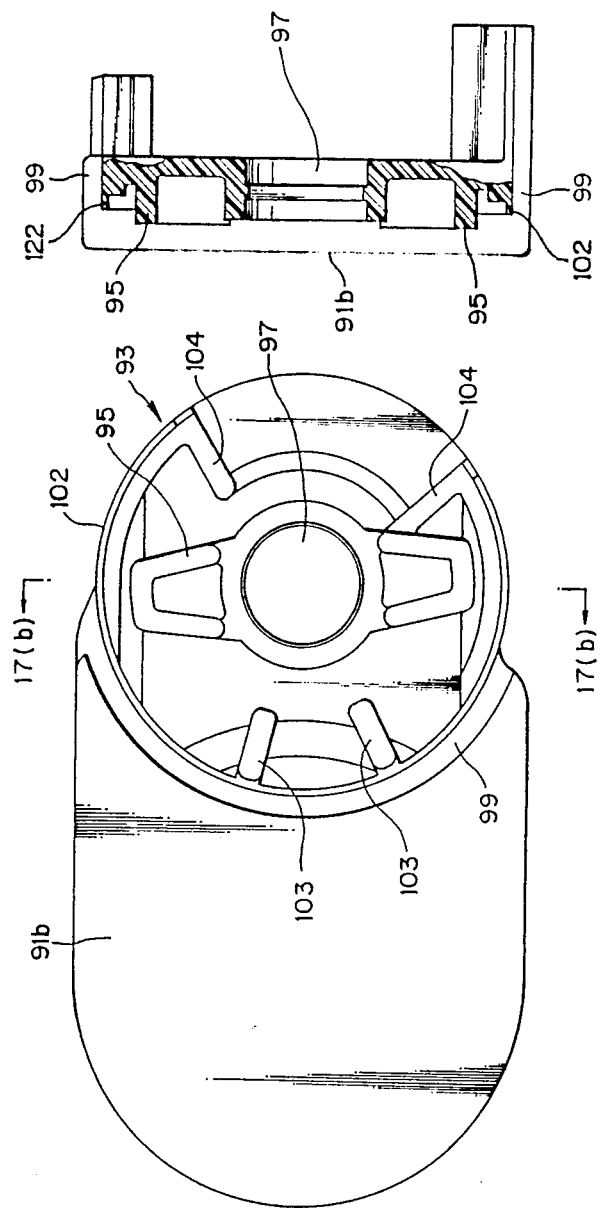

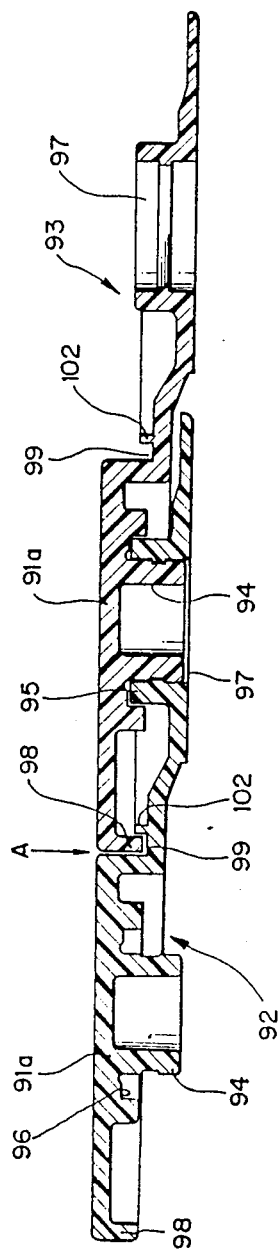

CARRIER FOR CABLES AND THE LIKE

This invention relates to a cable drag chain which is suitable for supporting and guiding hoses, electrical cables or similar flexible conduits (hereinafter referred to simply as "cables" or "conduits" for brevity) for supplying power to a moving object.

PRIOR ART

The cable drag chains are largely classified into an open type and a closed type. It is easy to accommodate or withdraw cables in or from conventional open-type cable drag chains. However, the cables are supported and guided by the chain in exposed state, so that it is likely that the cables are damaged due to deposition of foreign matter from outside, which is a serious problem from the standpoint of protection of the cables. On the other hand, with respect to conventional closed-type cable drag chains, as disclosed in Japanese Laid-Open Patent Application No. 56-159914 for example, the circumference of the drag chain is closed to accommodate cables in unexposed state. However, when mounting cables, the drag chain requires threading of the cables from one to the other end thereof, and replacement of cables is extremely troublesome, taking considerable time and labor. In addition, it has a drawback that, for repair or inspection of a cable portion in a midway position of the chain, the whole length of the cable has to be extracted from the drag chain.

PROBLEMS TO BE SOLVED BY THE INVENTION

The present invention has as its object the provision of a cable drag chain in which each one of the link units which constitute the drag chain has members, namely, a pair of opposingly faced link plates and a pair of coupling bars connecting the upper and lower sides of the link plates, which are separable into four parts. A cable drag chain may be assembled in the field by assembling link units in such a manner as to close in the cables or conduits after connecting the opposite ends of cables to the fixed and movable ends of the drag chain. The assembly permits an operator to open upper coupling bars between the fixed and movable ends of the drag chain to accommodate cables without twisting or intertwining. One end of each upper coupling bar which connects the upper side of paired link plates is pivotally mounted to permit opening and closing the other end, even at a midway position of the drag chain, for inspecting or repairing the cables. The separable assembly of four parts facilitates replacements, additions or subtractions of the link units in midway positions of the drag chain.

MEANS FOR SOLVING THE PROBLEMS

In order to achieve the above-mentioned objects, there is provided an openable closed-type cable drag chain with the type in which the upper and lower sides of opposingly spaced link plates of a large number of flexibly connected link units interconnected by coupling bars to accommodate and support cables, hoses or flexible-like conduits therein in guided state, the cable drag chain essentially including: cooperating projections and recesses detachably engageable with each other and provided at one end on the inner facing side of the paired link plates and at the other end on the outer facing side, respectively; upper coupling bars interconnecting the upper sides of the link plates and each having one end thereof detachably and pivotally mounted in one link plate and the other end detachably latched in the other link plate; and lower coupling bars interconnecting the lower sides of the link plates, each having the opposite ends thereof detachably fitted in the link plates.

OPERATION

All of the paired link plates and upper and lower coupling bars are detachably joined to permit assembling and disassembling. Therefore, a cable which has its one end fixed and the other end connected to a moving object can be mounted on the drag chain in shielded state by successively and flexibly coupling the cooperating projections and recesses on the inner and outer sides of overlapping end portions of the adjacent link plates, fitting lower coupling bars in the lower sides of the paired link plates into a flexible gutter-like form for accommodating the cable, and fitting the opposite ends of upper coupling bars in the paired link plates.

In order to detach the closed-type drag chain from the cables, the other end of the upper coupling bar is uncoupled and then opened by turning same about the pivotally mounted end, and the open gutter-like drag chain can then be removed from the cables.

Further, when replacing part of the drag chain which accommodates cables or conduits, the pivotally mounted end of the upper coupling bar is detached after opening the bar in the above-described manner, and then the lower coupling bar is removed, while uncoupling the overlapping end portions of the adjacent link plates. By so doing, the link unit can be disassembled into four parts; namely, into two link plates and two coupling bars, so that any part or all of the link units can be replaced easily.

BRIEF DESCRIPTION OF THE DRAWINGS

The drawings illustrate various embodiments of the invention, in which:

FIG. 2 is an enlarged fragmentary perspective view of a major portion of the cable drag chain;

FIGS. 3(a) through FIG. 3(e) combine to comprise an exploded perspective view of a link unit, FIG. 3(a) showing an upper coupling bar, FIG. 3(b) and (c) showing a pair of opposed spaced link plates, FIG. 3(d) showing a partition plate to be erected between the upper and lower coupling bars, and FIG. 3(e) showing a lower coupling bar;

FIG. 5 is a horizontal section of adjacent link plates with end portions overlapped and coupled with each other;

FIG. 16(a) is an enlarged front view of the inside surface of a link plate;

FIG. 16(b) is a cross-sectional view of a link plate taken along line 16(b)—16(b) of FIG. 16(a);

FIG. 17(a) is an enlarged front view of the outside surface of the link plate on the opposite side of the unit;

FIG. 17(b) is a cross-sectional view of a link plate taken along line 17(b)—17(b) of FIG. 17;

FIG. 18 is a cross-sectional view similar to FIG. 5 of two interconnected link plates of FIG. 16;

DESCRIPTION OF THE PREFERRED EMBODIMENTS

Figure 1:
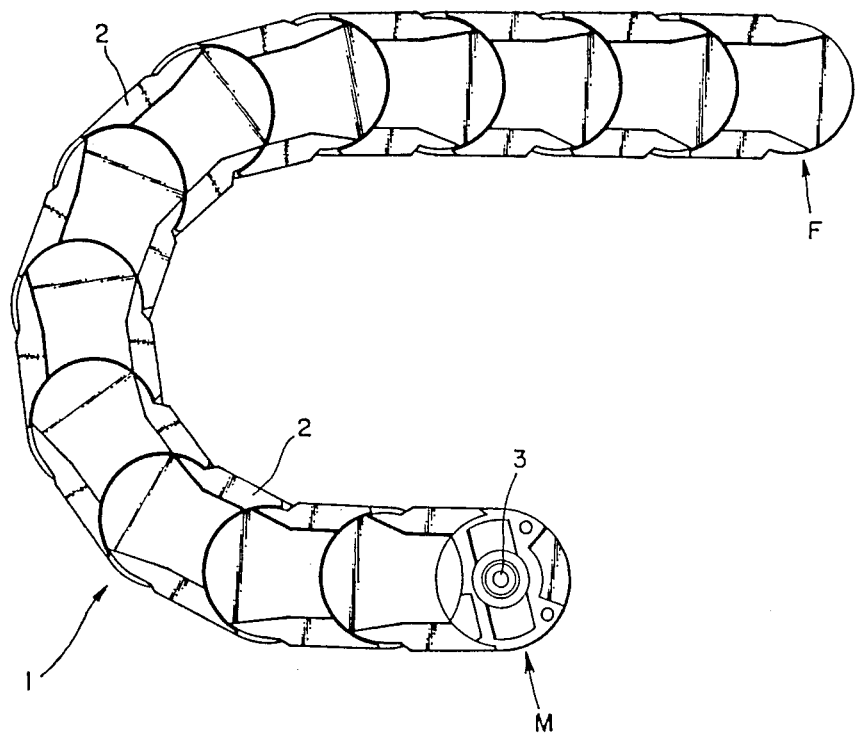
FIG. 1 is a side view of a cable drag chain with the link plates in flexed state.

The cable drag chain 1 which accommodates and supports cables as shown in FIG. 1 is formed by successively and flexibly connecting a large number of link units serially end to end in overlapped state by the use of link pins 3, the respective link units are connected such that they are flexible or articulated between fixed and movable ends F and M of the cable drag chain 1, for example, in the downward direction in the drawing, but not in the other directions. The components of the drag chain are preferably composed of a hard durable plastic material which is resilient and/or compressible so as to permit the components to be snap-fitted together against inadvertent disassembly and yet able to be snapped apart to afford assembly and disassembly in the field.

As shown in FIG. 2, the respective link units 2 have a pair of opposingly spaced link plates or end members 4a and 4b, an upper coupling bar 6 detachably connecting the upper sides of the paired link plates to each other, a lower coupling bar 7 detachably connecting the lower sides of the two link plates to each other, and a partition plate 8 detachably erected between the upper and lower coupling bars 6 and 7. The link plates 4a and 4b and the upper coupling bar 6 and the lower coupling bar 7 are assembled to form a generally rectangular hollow box structure with open front and rear sides in the longitudinal direction of the series, providing a conduit for the cable.

When assembled into a drag chain, the link units cooperate to produce a conduit for the cables which is entirely closed. To this end, the link plates have forwardly-projecting side parts which overlap rearwardly-projecting side parts of the adjacent units in the series. In addition, the upper coupling bar and the bottom coupling bar each have forwardly-projecting skirts which overlap rearwardly-projecting skirts of the corresponding element of the next link, throughout the range of articulated movement between the link units. Thus, when the links are interconnected with similar links into a drag chain, their hollow interiors are interconnected with another to form an uninterrupted conduit, and yet the conduit is entirely enclosed against the intrusion of dirt or other foreign matter.

Figure 4A:
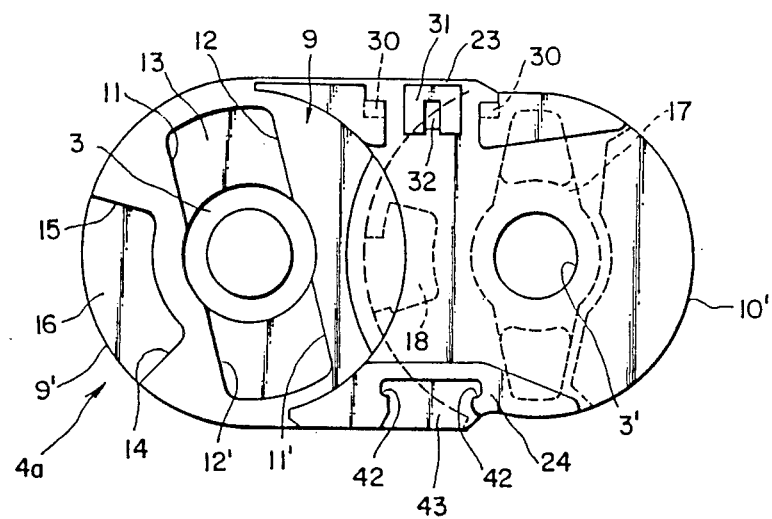
FIG. 4(a) is a face view of the inner side of the link plate with a pivotal support portion for the upper coupling bar and FIG. 4(b) is a face view of the opposite side of the link plate.
Figure 4B:
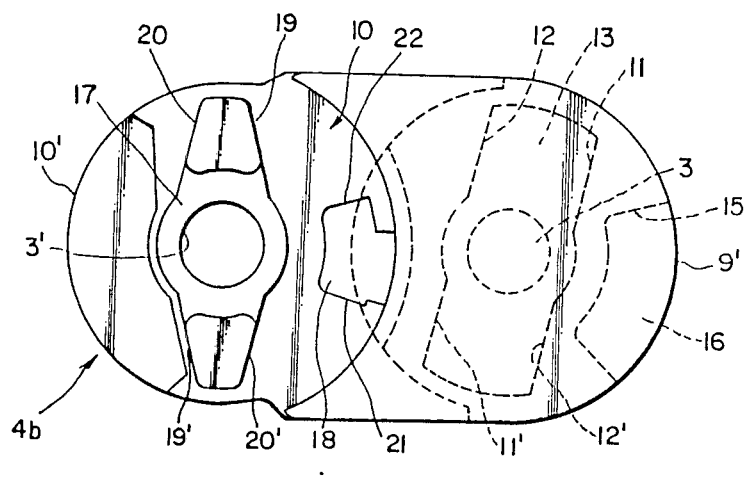

The upper coupling bar 6 is fitted rotatably about the upper side of one link plate member 4a. All of the link plates are provided with a snap-fit connecting pin 3 projecting from an inner joint recess which is formed on the inner facing side of one end portion thereof, and a snap holder hole 3' bored in an outer recess 10, as shown in FIG. 4(b), for disengageably fitting on the connecting pin 3. As shown in FIG. 5, the inner and outer joint recesses 9 and 10 of adjacent link plates are connected in overlapped state by snapping the connecting pin 3 in the snap holder hole 3', successively connecting the link units in series to form a cable drag chain 1 as shown in FIG. 1.

As shown particularly in FIGS. 2 and 3, the respective link units 2 are formed by assembling an upper coupling bar 6 having an upper cover portion 6c, a pair of opposed spaced link plates 4a and 4b, a partition plate 8 and a lower coupling bar 7 having a cover portion 7b. As shown in FIGS. 3(b), 4 and 5, connecting pin 3 projects from inner joint recess 9 on the inner side of one end portion of each of the paired link plates 4a and 4b. Provided in symmetrical positions on the opposite sides of each connecting pin 3 are first flexing-limiting surfaces 11 and 11' which limit, for example, the angle of downward flexing of the drag chain 1 as in FIG. 4, inversion-blocking surfaces 12 and 12' which block inversion of the chain flexing direction, for example, flexing in the upward direction in FIG. 4. The surfaces define between them a stopper holding recess 13 with opposing parallel surfaces. A sector-shaped notch 16 is defined between a second flexing-limiting surface 14 which limits the downward flexing of the chain in cooperation with the first flexing-limiting surfaces 11 and 11', and with an inversion-blocking surface 15 for inhibiting upward flexing of the chain in cooperation with the first inversion blocking surfaces 12 and 12'.

On the other hand, provided on the outer joint recesses 10 at the other ends of the paired link plates 4a and 4b are a snap holding hole 3' for fitting engagement with the snap-fit connecting pin 3, a stopper 17 of boat-like shape loosely and rotatably fitted across the diameter of the stopper holding recess 13, and a sector-shaped stopper 18 loosely and rotatably fitted in the sector-shaped recess 16. At linearly converging ends of the stopper 17, it is provided with first flexing-stopper surfaces 19 and 19' which abut against the flexing-limiting surfaces 11 and 11' by rotation, and first inversion-stopper surfaces 20 and 20' which abut against the first inversion-blocking surfaces 12 and 12' by rotation, respectively. The sector-shaped stopper 18 is formed with a second flexing-stopper surface 21 which is rotatable into abutment against the second flexing-limiting surface 14 and a second inversion stopper surface 22 which is rotatable into abutment against the second inversion-blocking surface 15.

Accordingly, when connecting the inner joint recess 9 at one end of a link plate to the outer joint recess 10 at the other end of a longitudinally adjacent link plate in the series, as shown in FIG. 5, they are pivotally connected in overlapped state by snapping in the connecting pin 3 in the holder hole 3'. The connection limits the maximum angle of downward flexing as in FIG. 1 as a result of rotational abutment of the first flexing-limiting surface 11 and 11' against first flexing-stopper surfaces 19 and 19' and rotational abutment of the second flexing-limiting surface 14 against the second flexing-stopper surface 21. Further, by rotational abutment of the first flexingblocking surfaces 12 and 12' and rotational abutment of the second inversion-blocking surface 15 against the second inversion-stopper surface 22, inverse flexing of the cable drag chain from the direction in FIG. 1 is inhibited, without permitting the middle part of the chain to hang down in a stiffened state. As shown in FIG. 4(b), in each link the surfaces 12 and 12' are parallel to the surfaces 20 and 20' and the surface 15 is parallel to the surface 22, whereby these respective surfaces abut another when the link is overlapped with an adjacent link when the drag chain is straight, thereby preventing upward flexing, but allowing downward flexing.

The arcuate surface 9' at one end of the link plates 4a and 4b is formed to have a smaller radius than the arcuate surface 10' at the other end, permitting the adjacent link plates to flex downwardly through a greater angle relative to each other. Therefore, it becomes possible to minimize the radius of flexing of the chain 1. By reducing the radius of the arcuate surface 10', it becomes possible to increase the length of flexing rotational guide surfaces of the arcuate surfaces 9' of the adjacent link plates to ensure smooth and secure flexing guidance of the link plates relative to each other.

Figure 6A:
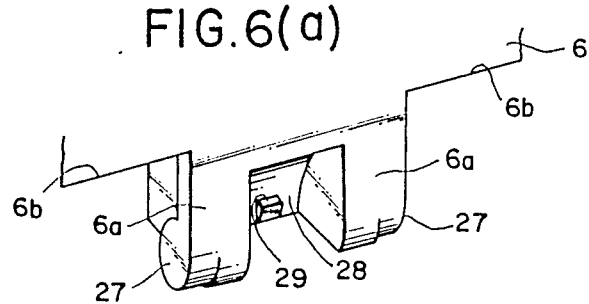
FIGS. 6(a) and (b) combine to comprise an exploded fragmentary perspective view of a pivotal joint portion detachably coupling one end of the upper coupling bar with the upper side of one of the link plates, showing in FIG. 6(a) one end of the upper coupling bar and in FIG. 6(b) the upper side of the link plate.
Figure 6B:
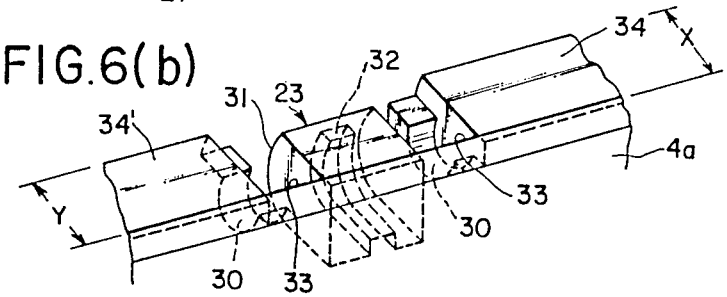
Figure 7A:
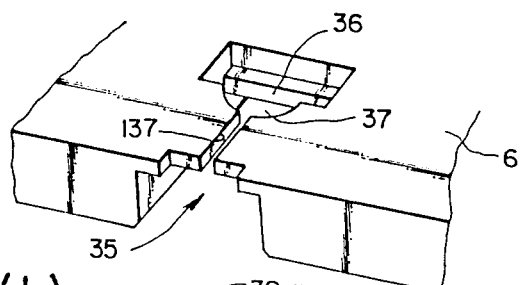
FIG. 7(a) and 7(b) combine to comprise an exploded fragmentary perspective view of a detachable latch portion at the other end of the upper coupling bar cooperating with the upper side of the other link plate, showing in FIG. 7(a) the other end of the upper coupling bar and in FIG. 7(b) the upper side of the other link plate.
Figure 7B:
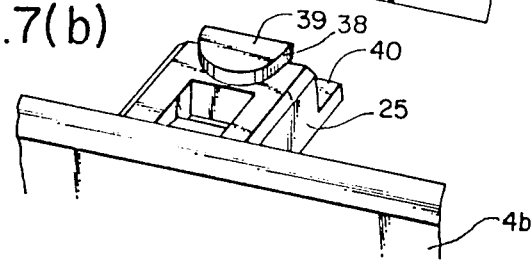

One link plate 4a [see FIGS. 3(b) and 6(b)] is provided with an upper pivotal support portion 23 at its upper side, which is to be detachably and rotatably fitted on one end of the upper coupling bar 6 and a lower coupling portion 24 with a cover portion 24' to be detachably fitted on one end of the lower coupling bar 7, while the other link plate 4b [see FIGS. 3(c) and 7(b)] is provided with a snap holder portion 25 at its upper side, which is to be detachably fitted on the other end of the upper coupling bar 6, and a lower coupling portion 26 with a cover portion 26' to be detachably fitted on the other end of the lower coupling bar 7.

Provided on extensions 6a and 6b at one end of the upper coupling bar 6 are a pair of rocking shafts 27 to straddle the upper pivotal support portion 23. The shafts 27 comprise one hinge element for pivotally mounting the coupling bar 6 on the side plate 4a. The pivotal movement is controlled by a rocking guide recess 28 and a snap locking projection 29 protruding from the end wall of the recess 28 as shown in FIG. 6(a). Provided on the upper pivotal support portion 23 of one link plate 4a are journal-bearing surfaces 30 comprising complementary hinge elements for supporting rocking movements of the rocking shafts 27, a rocking guide projection 31 for the rocking guide recess 28, and a snap locking recess 32 for the snap projection 29. Accordingly, one end of the upper coupling bar 6 is blocked against movements in back and forth directions, sideward directions and downward direction by fitting engagement of the rocking shafts 27 with the journal bearing surfaces 30, and blocked against inadvertent movement in the upward direction by snap fitting of the snap projection 29 in the snap holding recess 32 and sliding engagement of the rocking guide recess 28 with the arcuate surface of the rocking guide projection 31. Consequently, one end of the upper coupling bar 6 is immovably joined to the upper side of the link plate 4a without any free movement except for pivotal movement on the shaft 27, which is prevented by engagement of the other end of the coupling bar with the link plate 4b.

However, upon opening the lock at the other end of the upper coupling bar 6, the snap projection 29 may be disengaged from the snap holding recess 32, and the rocking guide recess 28 is slidingly guided by the arcuate surface of the rocking guide projection 31. At the same time, the rocking shaft portions 27 become rockable, supported by the bearing surfaces 30. By abutment of the extensions 6a and 6b at one end of the upper coupling bar 6 against the inner surfaces 33 at the upper side of the link plate 4a, the open uprising rocking position of the upper coupling bar 6 is limited, permitting to fit in or detach the one end of the upper coupling bar at that position. When upright, the guide surface of the access 28 is free to disengage the arcuate surface of the projection 31, as indicated in FIG. 6(a).

In the flat-lying position of the upper coupling bar 6, the portions 34 and 34' contiguous to the end edges 6b of the upper coupling bar 6 are extended inwardly from the upper side of the link plate 4a to maintain the upper side of the link unit 2 in shielded state.

On the other hand, as shown particularly in FIG. 7(a), the other end of the upper coupling bar 6 is formed with a rocking recess 35 which disengageably couples with the snap holder lock portion 25 projecting on the inner side of the top wall of the link plate 4b, the recess 35 being provided with a snap holder hole 37 with a snap locking pawl abutment 36.

Therefore, by pressing the other end of the upper coupling bar 6 down over the snap holder portion 25 of the link plate 4b, the snap hole 37 is pushed open, locking the snap pawl locking abutment 36 between the shoulder 40 and the snap pawl 38 on the snap holder portion 25. The portion 25 fits within the recess 35, and the projection 39 fits in the snap hole 37, thereby detachably locking the other end of the upper coupling bar 6 with the top wall of the link plate 4b.

As shown in FIG. 7(a), the slot 137 extending from the holder hole 37 affords a degree of flexibility which enables the projection 39 to dislodge the snap pawl locking member 36 from between the shoulder 40 and the snap pawl 38 for disassembly.

Figure 7C:
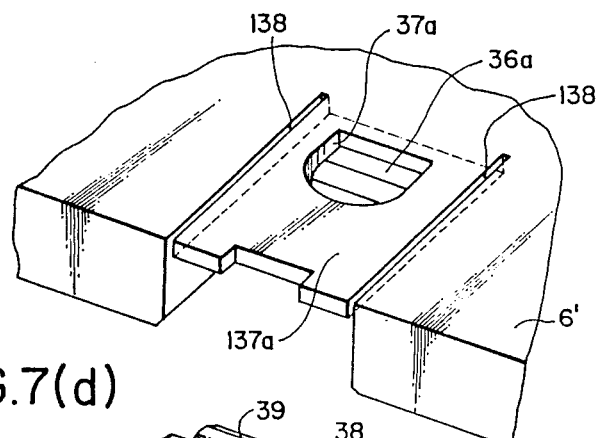
FIGS. 7(c) and 7(d) are view similar to FIGS. 7(a) and 7(b) showing a modified latch portion.
Figure 7D:
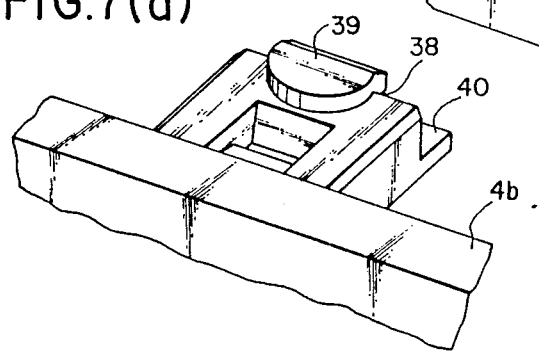

In FIGS. 7(c) and 7(d) an alternative arrangement is illustrated. The other end of the coupling bar 6' in this embodiment has a snap hole 37a overlying the locking member 36a which corresponds to the member 36 in FIG. 7(a). Instead of providing a single split, flexibility is produced by forming the hole in a tab 137a which is defined between a pair of slots 138,138 extending from the free edge inwardly past the opening 37a. When it is desired to dislodge the locking member, the tab 137a may be flexed upwardly to allow the member 36a to be displaced from between the projection 39 and the shoulder 40.

As best shown in FIG. 3, the upper cover portion 6c of the coupling bar 6 extends longitudinally of the chain at both sides of the transverse centerline to provide skirts 6c' and 6c" which are coextensive with and extend the full distance between the portions 34 and 34' of the link plates 4a and 4b. The skirt 6c' has an arcuate upper surface of the skirt 6c" of the adjoining link unit when the chain is assembled and the skirts overlap. In this fashion, the cover pottions of the adjoining links overlap to assure closure of the conduit and exclusion of foreign matter, even when the chain is flexed. As indicated in FIG. 6b, the portion 34 projects under the skirt 6c' a distance "x" which is less than the distance "y" by which the portion 34' projects under the skirt 6c". This ensures smooth opening of the coupling bar 6.

The opposite end portions 7a of the lower coupling bar 7 are formed in a T-shaped key, as shown in FIG. 3(e), and each provided with snap pawls 41 at the opposite sides thereof. On the other hand, the lower receiver projections 24 and 26 projecting from the inner sides of the link plates 4a and 4b are each provided with complementary T-shaped recesses 43 with locking detents 42 for receiving the snap pawls 41.

Accordingly, upon pressing the opposite end portions 7a of the lower coupling bar 7 into the recesses 43 in the bottom walls of the link plates 4a and 4b, the snap pawls 41 are snapped into the locking detents 42, detachably coupling the lower coupling bar 7 with the bottom walls of the link plates 4a and 4b.

The cover portion 7b of the coupling bar 7 has skirts 7c' and 7c" projecting longitudinally of the chain so as to be coextensive with and extend the full distance between the cover portions 24' and 26, of the side plates 4a and 4b, respectively. The upper surface of the skirt 7b' is arcuate so as to register with the lower surface of the skirt 7b" of the member 7 in the next link unit when the chain is assembled and the skirts overlap throughout the full range of articulated pivotal movement between adjacent link units. The overlapping assures exclusion of foreign matter from the hollow interior of the link units and the enclosed conduit during operation.

Further, as shown in FIGS. 2A and 3(e), on the upper or inner side, the lower coupling bar 7 is provided with an upwardly facing dovetail groove-like slide guide recess 45 having retention lips at its upper edge. Within the recess 45, a large number of locking projections 44 are formed in conical shape at the respective tip ends. On the lower or inner side, the upper coupling bar 6 is provided with an downwardly facing slide guide recess 46 [see FIGS. 2A and 3(a)] opposingly and immediately above the dovetail groove-like slide guide recess 45.

Figure 22:
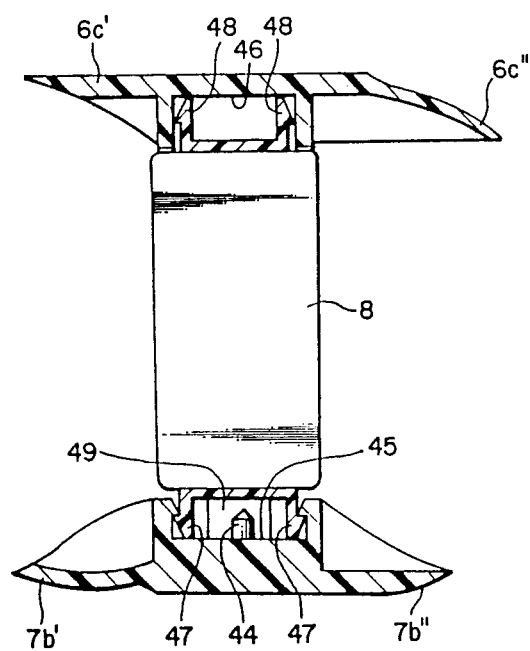
FIG. 22 is a vertical sectional view taken on the line 22—22 in FIG. 2.

The recess 46 does not have locking projections or retention lips. Slidably fitted in the opposing slide guide recesses 45 and 46 are a pair of lower slide snap coupling legs 47 formed at the lower end of the partition plate 8 and a pair of upper slide snap coupling legs 48 formed at the upper end of the partition plate 8, respectively. Hung between the paired lower snap coupling legs 47 is a short and small pendant locking member 49, as shown in FIG. 22, with a tapered guide surface at the lower end thereof, which is extractably engageable between the aforementioned projections 44.

Therefore, by pressing down the partition plate 8 in a desired position, the pendant locking member is gripped between the locking projections 44 to fix the partition plate in that position, thereby preventing abrasive damages which would be caused by loose movements of the cables accommodated in the cable drag chain 1.

Since there is no pendant locking member between the upper slide snap coupling legs 48, a partition plate 8 may be set upside down so that it can freely slide between the upper and lower recesses 45 and 46 without engaging with the locking projections 44. Both lips 47 and 48 have pawl elements cooperable with the retention lips of the lower guide recess 45, when engaged therein.

Figure 8A:
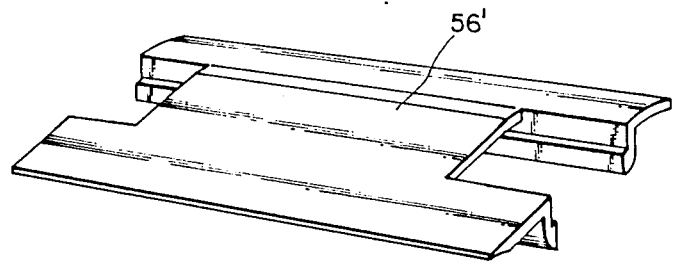
FIGS. 8 (a) and 8(b) combine to comprise an exploded perspective view of an embodiment of the upper coupling bar which is separable into two parts, FIG. 8(a) showing an upper cover member and FIG. 8(b) showing the body of the upper coupling bar.
Figure 8B:
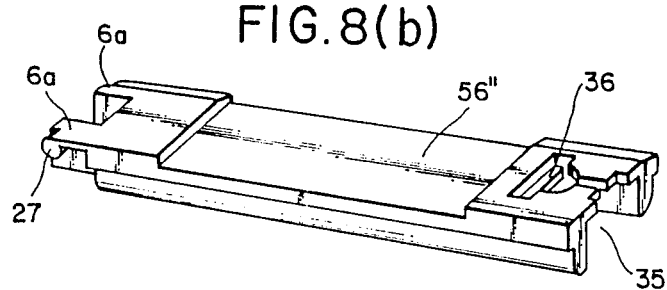
Figure 9A:
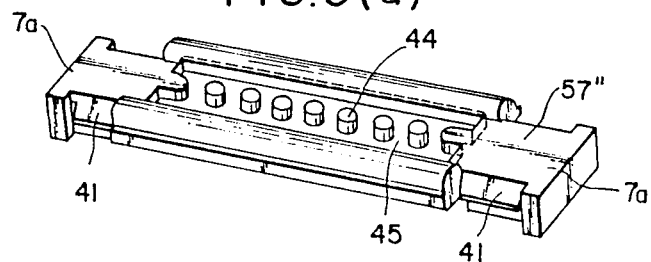
FIGS. 9(a) and 9(b) combine to comprise an exploded perspective view of a comparable embodiment of a lower coupling bar which is separable into two parts, FIG. 9(a) showing the body of the lower coupling bar, and FIG. 9(b) showing a lower cover member.
Figure 9B:
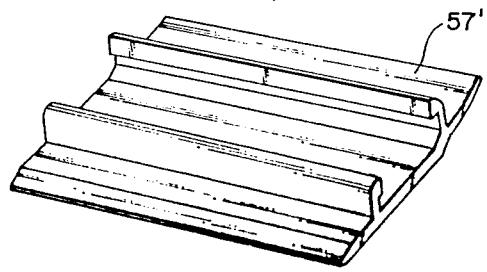

FIGS. 8(a) and 8(b) illustrate another embodiment of the upper coupling bar which is constituted by two separable interfitted parts, namely, an upper cover member 56' as shown in FIG. 8(a) and an upper coupling body member 56" as shown in FIG. 8(b). In other respects, the bar is identical to the bar 6. FIGS. 9(a) and 9(b) illustrate a lower coupling bar constituted by two separable interfitted parts, namely, by a lower coupling body member 57" as shown at (a) and a lower cover member as shown at 57'. In other respects, the bar is identical to the bar 7. By removing the upper and lower cover members 56' and 57', the closed type cable drag chain can be converted into an open type. It is noted that the body members have pawl-like ribs which engagebbeyond shoulders in the cover members to releasably retain the cover members in position on the body members.

Figure 10A:
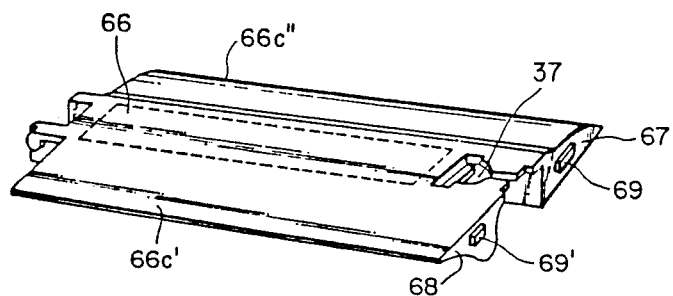
FIG. 10(a) is a perspective view of a modified upper coupling bar used in another embodiment of the invention.
Figure 10B:
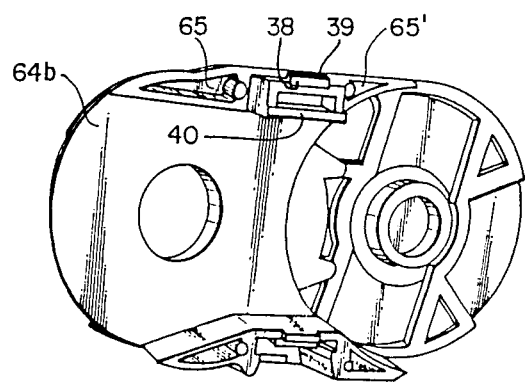
FIG. 10(b) is a perspective view of a modified link end plate which is used in conjunction with the bar of FIG. 10(a) in this embodiment of the invention.

FIGS. 10a and 10b illustrate a further embodiment which is useful when an external pressing force exerted on the overlapping skirts of the upper coupling bar tends to tilt or rock the bar about the centers' of its opposite end portions, opening a clearance along its side edges bordering on the adjacent link units during operation. This gives rise to a problem of intrusion of foreign matter into the cable drag chain. In addition, if the tilting movement becomes excessive, the locking portions of the upper coupling bar are likely to be dislodged from the link plates. Under these circumstances, the present embodiment prevents the rocking or tilting movements of the upper coupling bars, by providing an upper coupling bar 66 with locking pawls 69 and 69' on the end faces 67 and 68 of the locking portion 37 of the upper coupling bar. A complementary end plate 64b is provided with a locking recess 65 formed on the inner surface of the link plate to receive the pawl 69.

According to the present embodiment, the locking pawl 69 is formed on the end face 67 of the end portion with the fit-in coupling portion 37 of the upper coupling bar 66 at least on the side of the overlapping cover skirt 66c" and in a position spaced from the locking portion 37, and if necessary, a locking pawl 69' is projectingly formed on the side face 68 of the overlapping cover skirt 66c'. The locking pawls 69 and 69' are positioned to engage with locking recesses 65 and 65' on the inner surfaces of the link plate 64b.

When the fit-in coupling portion 37 of the upper coupling bar 66 is engaged with the snap holder portion 39 of the link plate 64b, the locking pawls 69 and 69' are engaged in the holder recesses 65 and 65'. To effect the engagement, the distance between the paired link plates on opposite sides of the drag chain is forcibly spread for a moment.

As will be appreciated from the foregoing description, according to the present invention, the upper coupling bar 66 is provided with the projecting locking pawl 69 at least in one portion on the end face 67 of the end portion with the locking portion 37 and at a space from the locking portion 37. Therefore, even if an external pressing force is exerted on the upper coupling bar 66, it will not tilt about the portion 37 and consequently it limits the possibility of opening a clearance space between the overlapping cover skirts 66c' and 66c". Accordingly, it becomes possible to prevent not only intrusion of foreign matter into the cable drag chain from outside but also prevent spontaneous dislodging of the upper coupling bar from the link plates, maintaining the interior of the cable drag chain in shielded state. The preclusion of tilting movements prevents generation of torsional stress in the upper coupling bar, and makes it possible to provide cable drag chains of higher durability.

Figure 11:
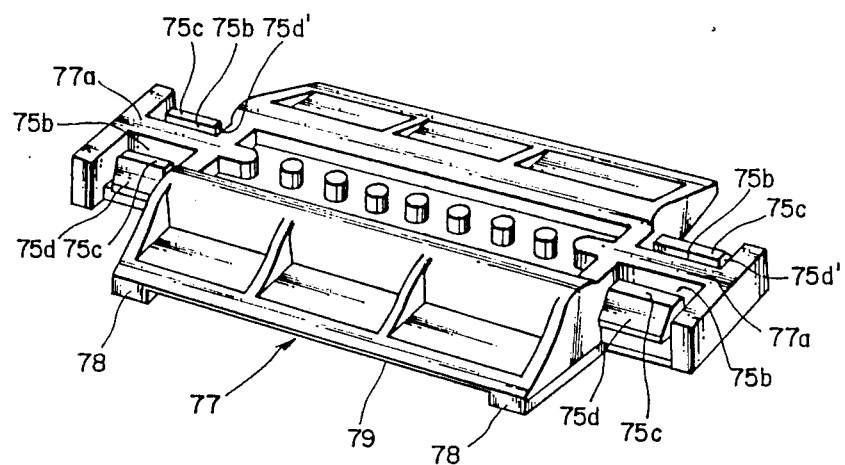
FIG. 11 is a front perspective view of a modified lower coupling bar which may be substituted for the lower coupling bar in any of the embodiments of the invention.

FIG. 11 illustrates a modified lower coupling bar 77 which is designed to reduce the likelihood of the lower bar being dislodged from the end plates, for example when the conduit is filled with a large number of cables. In this embodiment, the snap pawls 41 described above in connection with FIG. 3(e) are replaced with snap plates 75c, each with an enlarged locking pawl 75d along the opposite side edges and an intervening slit groove 75b. On pressing the T-shaped keys 77a at opposite ends of the lower coupling bar 77 into the locking recess on the lower side walls of the link plate, the erected snap plates 75c are resiliently fitted in easily by elastic deformation due to the existence of slit grooves 75b and the locking pawls 75d and 75d' on the snap plates 75e are fitted in a resiliently spread form in the holder grooves which are formed on the fitting recesses of the link plates, thereby connecting the opposite ends of the lower coupling bar to the lower side walls or the link plates.

The coupling face of one locking pawl 75d is projected in a greater degree than that of the locking pawl 75d. When pushing the T-shaped keys 77a of the lower coupling plate into the locking recesses of the link plates, firstly the locking pawl 75d is fitted in one of the holder grooves 42 of the link plate 4a and 4b, and then, using this locking pawl 75d as a fulcrum point, the other locking pawl 75d' is pushed in by applying an external force. Whereupon, the snap plates 75c which undergo a greater degree of elastic deformation are easily pressed in and the other locking pawl 75d' elastically spreads out to engage the other of the holder grooves 42, connecting the lower coupling bar with the link plates by a fit joint. Even in case the camming surface of the locking pawl 75d' is enlarged, it can be easily pressed in thanks to the greater degree of elastic deformation of the snap plates 75c which are each mounted on the outer side of a slit groove 75b. One can easily uncouple the lower coupling bar from the link plates by pushing a snap plate with a tip end of a screwdriver or the like in such a manner as to release one of the locking pawls.

The lower coupling bar 77 is provided with runners 78, 78 which extend along the edges of the skirt portion which underlies the skirt portion of the adjacent link unit and confronts the surface on which the drag chain is supported. The runners 78 are formed by providing a central portion 79 of reduced thickness relative to the thickness at both ends of the coupling bar. The runners accommodate to irregularities in the surface on which the chain may be dragged and resist wear.

Figure 12:
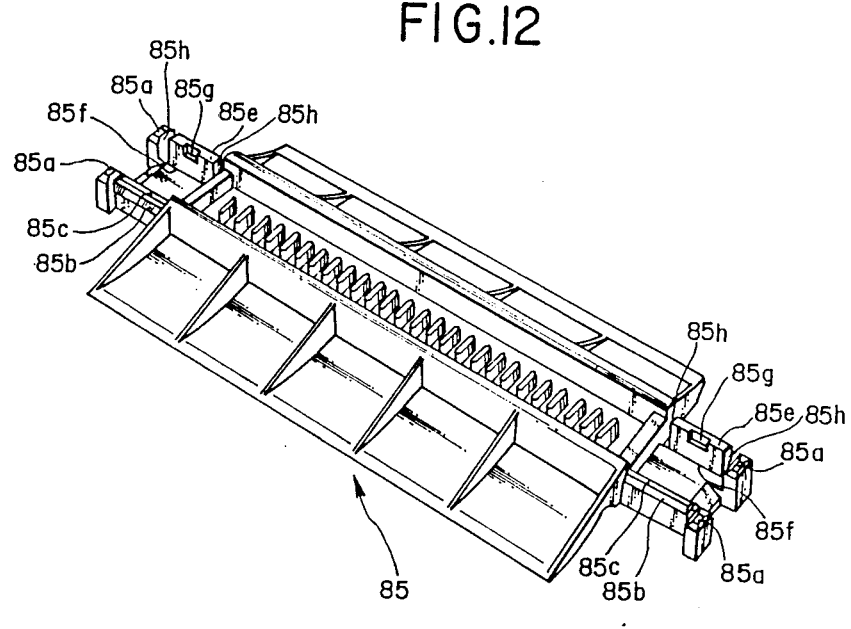
FIG. 12 is a rear perspective view of a different form of lower coupling bar which is used in a further embodiment of the invention.

FIGS. 12 through 14 illustrate an embodiment of the invention wherein the lower coupling bar is positively latched into engagement with the end plates, so that a tool must be used when it is desired to disengage the coupling bar from the end plates. A coupling bar 85 is designed to engage and latch with spaced end plates, one of which is shown at 83b in FIGS. 13 and 14.

As shown in FIGS. 12 and 14, a locking key 85a is provided at the tip ends of the opposite end portions of the lower coupling bar 85, and a coupling leg portion 85c with an outwardly projecting locking pawl 85b erected at one side edge. A snap plate 85e with an outwardly projecting locking pawl 85d projects inwardly at the other side edge through a slit groove 85f. A retreating recess 85g is formed in an inner upper portion of the snap plate 85e.

Figure 13A:
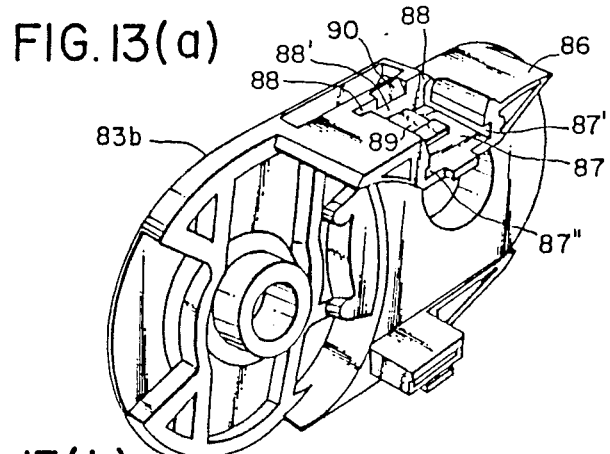
FIG. 13(a) is an inverted perspective view of the link end plate used in connection with the bar of FIG. 12.
Figure 13B:
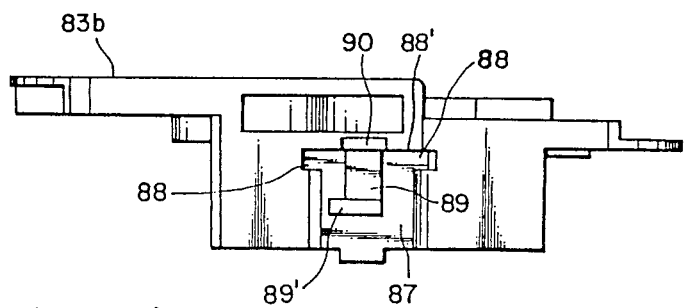
FIG. 13(b) is an inverted plan view of the link plate shown in FIG. 13(a)
Figure 13C:
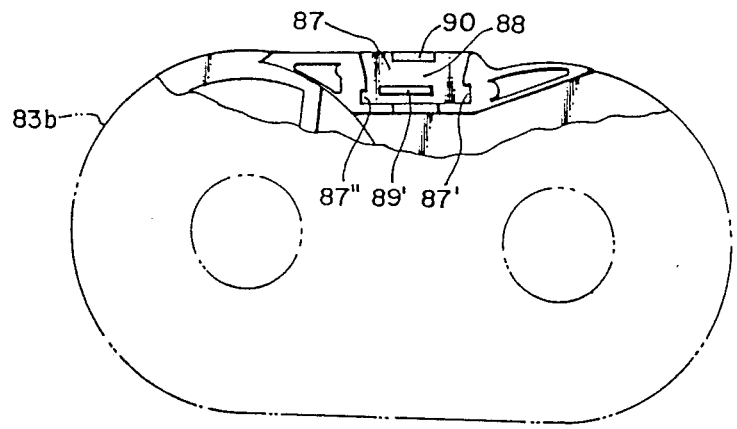
FIG. 13(c) is a fragmentary face view of the inverted end plate of FIG. 13(b), with the outline of the plate shown in phantom lines.

On the other hand, as shown in FIGS. 13(a) to 13(c), the socket portions 87 of the lower locking portion 86 of the link plate 83b is provided with a coupling offset portion 87', a coupling offset portion 87" and recesses 88 for engagement with the aforementioned coupling pawls 85b and 85e and locking key 85a of the lower coupling bar 85, respectively.

Further, provided between the coupling offset portions 87' and 87" of the socket portion 87 is a lock-up tongue member 89 which is fixed at its base end to an end face 88' of the recess 88 of the socket portion 87 and free at its tip end. A stopper tongue member 89' which is guided by the retreating recess 85g is formed at the tip end of the lock-up tongue member 89.

The socket portion which is formed at the lower side of the opposite link plate is similar in construction to the above-described socket portion 87 of the link plate 83b, and therefore, is explanation is omitted to avoid unnecessary repetitions.

FIGS. 14(a) to 14(d) show the order of coupling the opposite end portions of the lower coupling bar 85 with the socket portions 87 of the link plates.

Figure 14A:
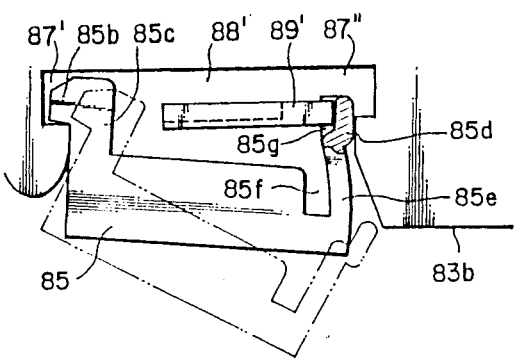
FIGS. 14(a) through 14(d) show diagrammatically the procedure for locking the coupling bar of FIG. 12 with the end plate of FIG. 13.
Figure 14B:
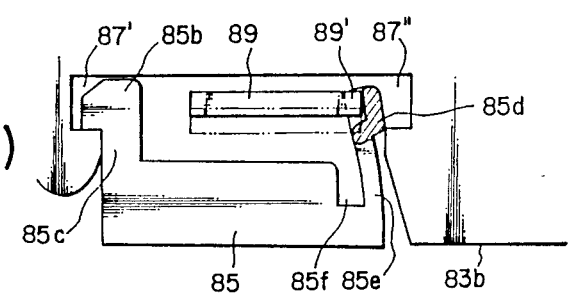
Figure 14C:
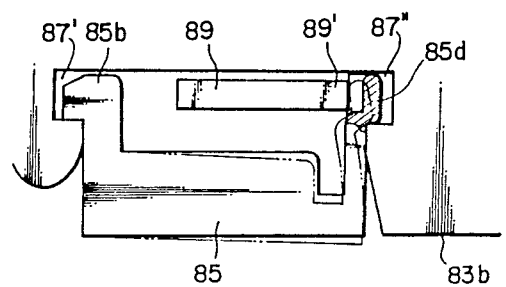
Figure 14D:
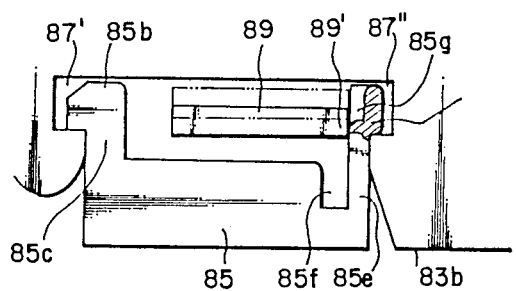
Figure 15:
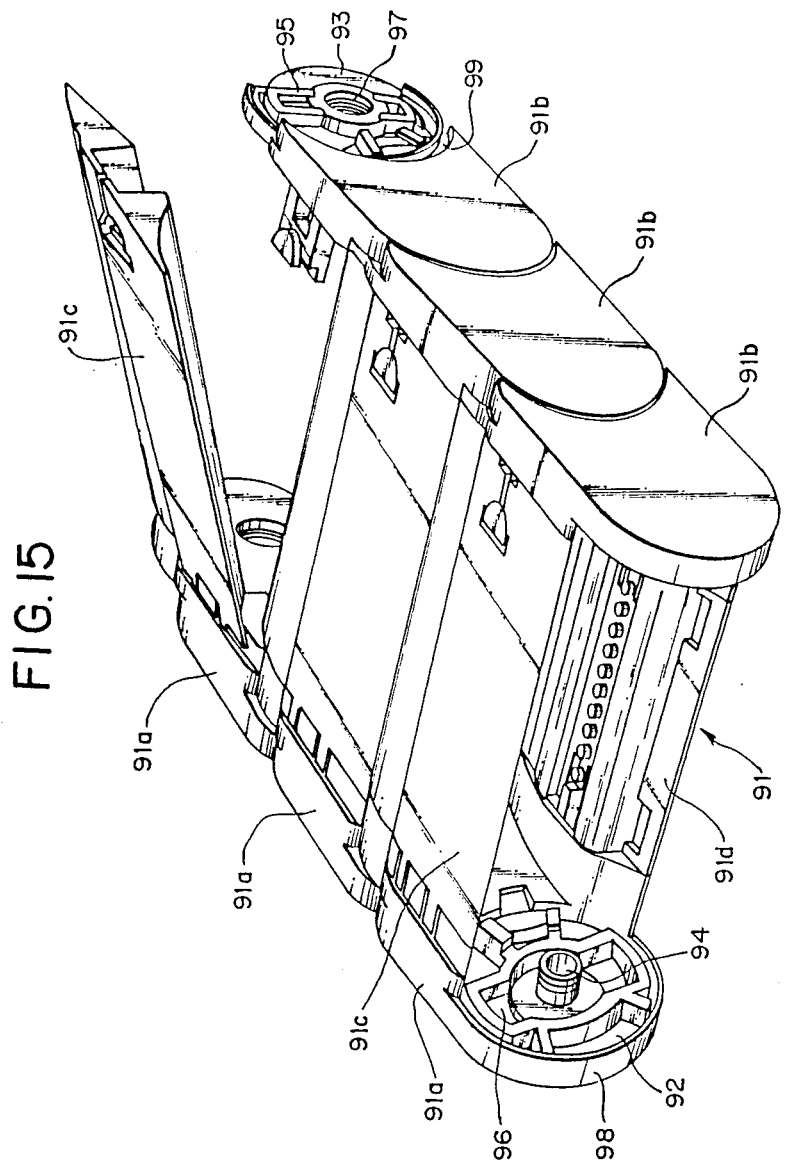
FIG. 15 is a perspective view similar to FIG. 2 showing a still further embodiment of an openable and closable sealed-type cable drag chain.

Firstly, as shown in FIG. 14(a), the locking pawl 85b which is formed on the coupling leg portion 85c at one side edge of the lower coupling bar 85 is engaged with the coupling offset portion 87' of the link plate 83b (as indicated by chain line). Next, the snap plate 85e is pressed in (as indicated by solid line) by using the engaged portion of the locking pawl 85b as a fulcrum point. Whereupon, the retreating recess 85g which is formed in the snap plate 85e is flexed inwardly receiving therein the stopper tongue 89' of the lock-up tongue member 89. As it is pressed in further, the stopper tongue 89' is pressed by the stepped portion at the lower edge of the retreating recess 85g and flexed upwardly from the position of chain line to the position of solid line as shown in FIG. 14(b), so that the locking pawl 85d of the snap plate 85e is resiliently spread into the offset portion 87" from the position of chain line to the position of solid line as shown in FIG. 14(c). As a result, the lower sides of the link plates are coupled with the opposite end portions of the lower coupling bar in an interlocked state as shown in FIG. 14(d). By the elastic restoration of the snap plate 85e to its extended position, the stopper tongue 89' is moved out of the recess 85g in the snap plate 85e, and is elastically restored to a position in abutting engagement with an inner surface portion of the snap plate 85e (restoration to the position shown in solid lines from the position shown in chain lines). Therefore, the snap plate 85e is now blocked against inward flexing deformation away from the locking pawl 5d, and as a result, the locking pawls 85b and 85d are securely coupled with the locking offset portions 87' and 87'', precluding dislodging of the lower coupling bar 85 from the link plates.

In order to uncouple the lower coupling bar 85 from the link plates, a tool, for example a tip end of a screwdriver, is inserted through a recess 90 shown in FIGS. 13(a) to 13(c), pushing the lock-up tongue member 89 from the solid line position of FIG. 14(d) into the chain line position.

Since the locking pawl 87' serves as a fulcrum point when fitting in the other locking pawl 87'', it is formed in a greater size than the latter.

According to this embodiment of the invention, for coupling link plates with the lower coupling bar which is supposed to support the load like cables, one of the opposing paired locking pawls is projected from a snap plate which is permitted of easy flexing deformation by the provision of slit grooves 85h. Therefore, locking of the locking pawl is extremely facilitated by the high flexibility of the snap plate 85e. Once locked in, the locking pawls are blocked by the lock-up tongue member against flexing movements in the uncoupling direction, precluding the possibilities of inadvertent dislodgment of the locking pawls. Even when the cable drag chain is in operation, the lower coupling bar can support the weight of cables or the like without dislodgment, thereby ensuring safety of operation as well as durability of the cable drag chain in addition to a number of excellent practical advantages, such as easy assembling and disassembling which is convenient for assembling or disassembling the chain on the spot for repair or replacements.

FIGS. 15-18 illustrate a modified cable drag chain 91 which is an improvement upon the drag chain 1 shown in FIGS. 1-5.

FIG. 5 shows the earlier-described structure having a series of link units with connection between adjacent link plates of the drag chain, wherein the connecting end portions of link plates 4a have an inside recessed portion 9 and an outside recessed portion 10 formed off-set, respectively and a connecting pin 3 projecting from the inside recessed portion 9 makes a snap engagement with a connecting pin inserting hole 3' defined through the outside recessed portion 10 for connection of a next link plate for permitting the link plates 4a to be pivotally connected for limited flexure.

The overlapping surfaces made by the inside recessed portion 9 of the link plate 4a and the outside recessed portion 10 for connection of the next link plate 4a are formed into overlapped surfaces having a stepped cross-section at the outer edge 9' of the inside recessed portion as shown in FIG. 5.

The links of FIG. 5 have a drawback that since the overlapped surfaces have the stepped cross-section, a foreign substance such as dust or oil entering through the gap in the overlapped surfaces from the outside, as shown by an arrow A, may deposit and accumulate between the overlapped surfaces 9 and 10. Then, it not only damages articulation and rotation of the overlapped surfaces but also causes a defective bending of the connection between the link plates by entering into the interfitting surfaces of the connecting pin 3 and the connecting pin inserting hole 3', whereby the function of the cable drag chain is substantially impaired. The present embodiment solves the drawback of the limits of FIG. 5, whereby a seal, preferably a labyrinth seal arrangement, is formed for preventing a foreign substance from entering from the outside through the gap into the space between the overlapped surfaces.

FIGS. 15-18 show the embodiment of the present invention wherein a pair of link plates 91a and 91b, spaced apart at a distance in confronting relation, are connected by connecting bars 91c, 91c capable of being disengaged at their upper and lower sides to construct a box-shaped link unit, an inside recessed portion 92 and an outside recessed portion 93 offset at the connecting end portions of the respective link plates 91a and 91b.

The inside recessed portion 92 has a connecting pin 94 projecting inwardly therefrom and a stopper-receiving recess 96 to be engaged with a ship-shaped stopper 95 projectingly disposed on the outside recessed portion 93 and the outside recessed portion 93 further has a connecting pin inserting hole 97 defined therethrough.

The inside recessed portion 92 has an outside edge provided with a cutout ring-shaped semi-annular seal flange 98, projecting inwardly which is a feature of the present embodiment and the outside recessed portion 93 has a semi-annular recessed seal groove 99 formed on it for causing the flange 98 to rotatably fit into the groove 99.

FIGS. 16(a) and 16(b) show the inside recessed portion 92. FIG. 16(a) is a front view showing the inside of the link plate 91a and FIG. 16(b) is a cross-sectional view of it taken along line 16(b)—16(b) of FIG. 16(a). There is disposed a space 108 between the inner circumference of the seal flange 98 and an outer wall surface 96' separating the stopper receiving recess 96 as well as auxiliary stopper receiving pieces 100 for making an engagement with the seal groove 99. There is also provided a separating-tool-inserting recess 101 used for separating the link plates connected by the connecting pins each other.

The outside recessed portion 93 will be described with reference to FIGS. 17(a) and (b). FIG. 17(a) is a front view showing the outside of the link plate 91B and FIG. 17(b) is a cross-sectional view of it taken along line 17(b)—17(b) of FIG. 17(a). There stands a cutout ring-shaped seal wall surface 102 projecting outwardly to form the seal groove 99 with which the seal flange 98 of the inside recessed portion for connection 92 rotatively engages. Denoted by numerals 103 are auxiliary stoppers to be struck against the auxiliary stopper-receiving pieces 100 formed on the inside recessed portion 92 and denoted by numerals 104 are also auxiliary stoppers to be struck against auxiliary stopper receiving pieces 105 formed on the inside recessed portion 92, the stoppers 95, 103 and 104 being struck against the stopper receiving recess 96 and the stopper receiving pieces 100, 105 for regulating a flexing angle of the link plates 91a and 91b.

The connection between the inside recessed portion 92 with the outside recessed portion 93 will be described with reference to a cross-sectional view shown in FIG. 18. A link plate 91a is connected with a next link plate 91a flexibly, rotatably and disengageably by a snap engagement of the connecting pin 94 with the connecting pin inserting hole 97. The inside recessed portion 92 and the outside recessed portion 93 are offset and overlapped for forming flat outside surfaces of the link plates, as shown.

The seal flange 98 of the inside recessed portion 92 is engaged with the seal groove 99 of the outside recessed portion 93 to flexibly and rotatably seal the joint at A. The wall 102 of the seal groove 99 slides along the inner circumference of the seal flange 98.

As a result, the overlapped surfaces of the adjacent link plates 91a are sealed in such a manner that a foreign substance entering from the direction, shown by an arrow A, is prevented from entering inwardly by a labyrinth formed by the engagement of the seal flange 98 and the seal groove 99.

Although the groove 99 only confronts a part of the surfaces of the link plates 91a, a labyrinth function is formed by the overlap of the inner circumference of the seal flange 98 and the outer circumference of the seal flange 102.

Figure 19:
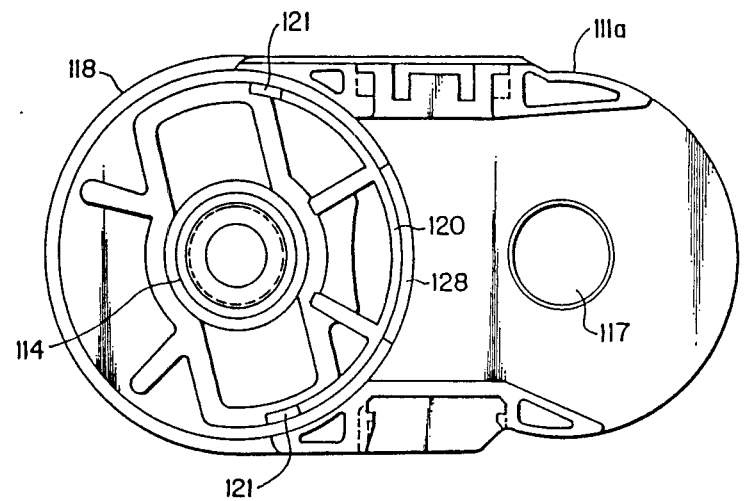
FIGS. 19 and 20 are views similar to FIGS. 16a and 17a showing a further embodiment of the invention.
Figure 20:
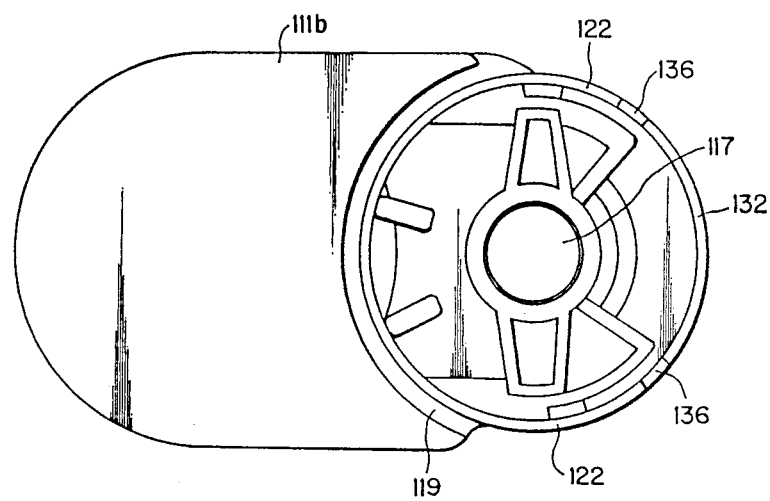
Figure 21:
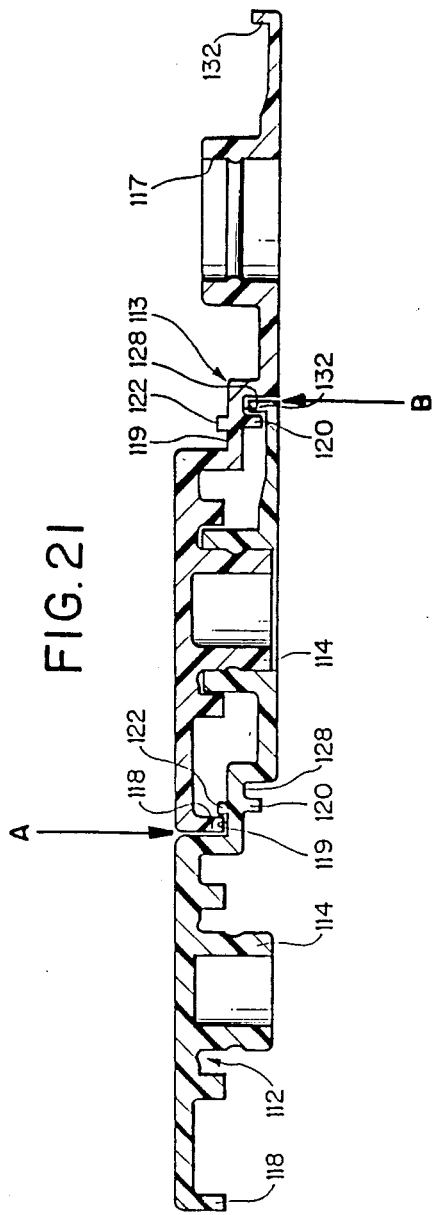
FIG. 21 is a view similar to FIG. 18 of two interconnecting link plates of FIG. 19.

If it is desired to provide a similar labyrinth seal for the interiorally-facing surface of the interconnected link plates, the embodiment shown in FIGS. 19-21 may be used.

In this embodiment, the link plates 111a and 111b have an inside recess portion 112 (see FIG. 21) and an outside recess portion 113. A pin 114 projects inwardly from the portion 112 to engage in a pin-inserting hole 117 in the outer recess portion 113. The portions overlap as shown in FIG. 21 to leave a joint space on the outside at A and a joint space on the inside at B. The stoppers in this embodiment are similar to the stoppers in the embodiment shown in FIGS. 15-18. A flange 118 cooperates with a groove 119 to provide a labyrinth seal at the junction A in the same way as described above in connection with FIG. 18. The groove 119 is formed by a semi-annular flange 122 to produce a labyrinth seal against the infusion from the outside.

A similar seal is provided against infusion of the dirt from the inside. To this end, a flange 132 extends partly around the periphery of the outwardly-facing recess 113 and projects into a groove 128 formed by a semi-annular wall flange 120. The flange 120 on the inwardly-facing recessed portion 112 terminates at the top and bottom of the link plate in a declining ramp shown at 121 in FIG. 19.

At the ends of the flange segment 132 (see FIG. 20), there are arcuate ramps 136, 136 which merge the flange 132 with the wall flange 122 to provid a continuous wall about the full circle of the outwardly-facing recess portion 113 concentric with the opening 117.

The labyrinth seal provided by the flanges 118 and 122 at the junction A prevents infusion of dust and dirt into the space between the overlapping link plates and the labyrinth seal provided by the flanges 120 and 132 at the junction B prevent discharge of particles which may be sloughed from the conduit within the hollow link units.

SUMMARY

In accordance with the present invention, the cable drag chain constituted by a large number of link units, each having a pair of spaced parallel link plates which are connected by detachably fitted upper and lower coupling bars, one of the end portions of the adjacent link plates being offset inwardly and the other of the end portions being offset outwardly so that the adjacent link plates are coupled with each other in overlapped state in such a manner as to form generally flat surfaces on the inner and outer sides of the cable drag chain without projections or bulges which would hinder smooth flexing movements of the chain or which would cause abrasions on the surface of the cables accommodated within the series of link units. The link plates are linked to each other by inserting connecting pins, which are formed integrally with the link plates, into pin receiving holes, while limiting the range of flexing and inhibiting inversion of the flexing of the link plates by the rotational abutment by the stoppers of boat-like shape, which are formed integrally with one of the link plates, against the stopper-receiving recesses in the other end portion of the adjacent link.

Further, the upper and lower coupling bars connect with releasable connections which may be engaged with and disengaged from the opposing paired link plates without using special tools. The link unit thus formed can be easily disassembled into four separate components. Thus, it becomes possible to assemble a closed type cable drag chain around cables in the field which are extended between the fixed and movable ends F and M, in contrast to the conventional counterpart which requires an operator to thread the cables through the opening at one end of the drag chain. The drag chain of the invention can also be used for cables which have already been installed, can be removed from the cables independently of the latter by disassembling the respective link units. Further, it is possible to replace a link unit in a midway position of the cable drag chain, permitting partial repair or inspection of the cable in the drag chain.

The adjacent upper and lower coupling bars have cover portions which are continuously connected to cover the upper and lower sides of the link plates substantially in a gapless form, while the ends of the adjacent link plates are provided with inwardly projecting cover portions which overlap the cover portions of the coupling bar. Therefore, the link units are completely closed on the upper and lower sides, preventing intrusion of foreign matter which might damage the cables. In a case where the upper and lower coupling bars are formed by fitting a removable cover member on a coupling body member, the drag chain can be used as an open type, if necessary.

Furthermore, since the link unit can be disassembled into four separate parts, the capacity of the cable drag chain can be increased or reduced by changing the length of the upper and lower coupling bars according to the number and/or size of cables to be accommodated. In addition, the number of the link units can be increased or reduced to adjust the chain to a suitable length, and the link plates and upper and lower coupling bars are each configured in a shape which can be integrally molded by the use of a synthetic resin material or the like, giving considerable advantages such as facilitated manufacturing produces and low production cost.

While various embodiments of the invention have been herein illustrated and described, it is not intended to limit the invention to the precise embodiments but changes and modifications may be made therein and thereto within the scope of the following claims.

We claim:

1. For cables and like flexible conduits, a carrier capable of articulative movement accommodating the conduit within, comprising:
    a series of a plurality of units, said units having the same configuration and being interconnected in series to form said carrier;

each of said units comprising an assembly of left and right side wall members, an upper coupling bar and a bottom coupling bar, the assembly forming a hollow rectangular unit open to the front and back in the longitudinal direction;

each of said left and right side wall members having front and rear portions offset inwardly and outwardly, respectively, and the front portion of each member having a stopper mechanism overlapping and cooperating with the rear portion of the member in the forwardly adjacent unit of said series, for effecting pivotal articulative movement within a predetermined angular range with respect to each other;

one of said left and right side wall members having an inwardly-directed projection having a first hinge element for pivotally mounting said upper coupling bar therein, said projection overlapping the corresponding projections of the side wall members in the forwardly and rearwardly adjacent units of said series;

said upper coupling bar at one end having a complementary second hinge element connected to said first element, and at the other end thereof a latch capable of being locked to the other of the side wall members in said unit;

said upper coupling bar of each unit overlapping the upper coupling bar of the forwardly and rearwardly adjacent units of said series throughout said predetermined angular range of articulative movement afforded by said stopper mechanism;

said bottom coupling bar of each unit also overlapping the bottom coupling bars of the forwardly and rearwardly adjacent units of said series throughout said predetermined angular range of articulative movement afforded by said stopper mechanism.

2. A carrier according to claim 1 in which said inwardly-directed projection has a longitudinal length substantially the same as that of the upper coupling bar, providing a support for pivotally mounting said upper arm coupling bar, limiting the pivotal angle of the upper coupling bar and preventing the second hinge element from inadvertently disengaging the first hinge element.

3. A carrier according to claim 2 in which said inwardly directed projection comprises three portions, spaced apart from each other in the longitudinal direction.

4. A carrier according to claim 3 in which the inwardly projecting length of one of the forwardmost and rearmost portions which overlies the other of said portions of the corresponding side member of the adjacent unit is shorter than the projecting length of the other of said portions.

5. A carrier according to claim 3 in which the forwardmost and rearmost of said three portions provide a support for the pivotal movement of said upper arm, and the central portion has a resilient component limiting the pivotal angle of the upper coupling bar and preventing inadvertent disengagement of the first and second hinge elements.

6. A carrier according to claim 1 in which said bottom coupling bar has separable connections to said left and right side wall members.

7. A carrier according to claim 6 in which said left and right side wall members have projections for locking the separable connections of the bottom coupling bar.

8. A carrier according to claim 7 in which the separable connections of both ends of the bottom coupling bar comprise substantially T-shaped keys, both sides of the upright portion of each key being provided with a snap action pawl, and said projections of the side wall members having complementary T-shaped recesses having a detent to receive the pawl.

9. A carrier according to claim 7 in which both ends of the bottom coupling bar have keys of substantially T-shape, both sides of the upright portion of said T-shaped key being provided with a snap action plate having an engaging lip with an adjacent slit, said projection of the side wall members being provided with a complementary T-shaped recess having a detent to receive said lip.

10. A carrier according to claim 7 in which both ends of the bottom coupling bar are formed with two locking leg portions, respectively, one leg portion formed with a pawl at the outside thereof, the other leg portion comprising a snap action plate having a pawl at the outside thereof with an adjacent slit, and the upper inner side of said snap action plate being formed with an indentation; and the projection of said side wall member being formed with a recess receiving said leg portions of said bottom coupling bar, said recess being formed with a stepped portion and detents for engaging with pawls and leg portions, respectively, and a lock-up tongue member engaging the inner lower part of said snap action plate beyond said indentation.

11. A carrier according to claim 6 wherein said separable connections between said bottom coupling bar and said left and right side wall members comprise a resilient compressible plastic material so as to maintain said connections against inadvertent disengagement.

12. A carrier according to claim 1 wherein said pivotal articulative movement of said carrier has a center of rotation within said overlapping front and rear portions, said stopper mechanism comprising a combination of a convex portion and a concave portion which are symmetrical with respect to the center of rotation.

13. A carrier according to claim 12 in which the convex portion of the stopper mechanism is formed at the outside of the inwardly offset portion of the side wall member and the concave portion is formed at the inside of the outwardly offset portion, respectively, and a shaft for the pivotal movement is disposed at the center of said concave portion, said shaft engaging a bore provided at the center of the convex portion.

14. A carrier according to claim 12 which has a supplemental stopper mechanism comprising a second convex portion and a second concave portion.

15. A carrier according to claim 1 in which said latch at the other end of the upper coupling bar comprises a stepped portion and an aperture in the upper arm coupling bar, and a projection disposed in said other side wall member, said projection having a groove and an overlying locking piece engaging in said aperture, said aperture having a slit formed at the distal end of said upper coupling bar to afford resilient enlargement of said aperture affording release of said latch.

16. A carrier according to claim 1 in which said latch at the other end of said upper arm comprises a releasable locking pawl at the distal end thereof engaging said other side wall member.

17. A carrier according to claim 1 including a partition plate extending between said upper coupling bar and the bottom coupling bar.

18. A carrier according to claim 17, said upper coupling bar having a recessed groove slidably receiving the upper end of said partition plate and said bottom coupling bar having a series of projections between which the bottom of said partition plate is seated to limit slidable displacement of said upper end.

19. A carrier of claim 18, said partition plate having a hanging piece at its lower end fitting between said projections to prevent the partition plate from sliding, said upper end being without a hanging piece to afford inversion of said partition member affording slidable displacement in said recessed grooves.

20. A carrier according to claim 17, said upper coupling bar and the bottom coupling bar each having a recessed groove receiving the upper and lower ends of said partition member for slidable movement therealong, the recessed groove of said bottom coupling bar cooperating with the lower end of said partition member to prevent inadvertent ejection of the partition member and to permit sliding of the partition member.

21. A carrier according to claim 1 in which at least one of the upper coupling bar and the bottom coupling bar comprises a body member for connecting the left and right side wall members, and a cover member, said cover member being separably mounted on said body member.

22. A carrier according to claim 1 in which the overlapping front and rear portions of the adjacent side wall members have interfitted structure for preventing foreign matter from intruding therebetween.

23. A carrier according to claim 22, said interfitted structure comprising an inwardly-projecting semi-annular flange at the periphery of an inwardly-facing portion of said overlapping front and rear portions, and a complementary groove on the outwardly-facing portion of the overlapping front and rear portions, said flange and groove having a common radius of curvature concentric with said center of rotation.

24. A carrier according to claim 22, wherein said pivotal articulative movement of said carrier has a center of rotation within said overlapping front and rear portions, said interfitted structure comprising an outwardly-projecting semi-annular flange at the periphery of an outwardly-facing portion of said overlapping front and rear portions, and a complementary groove on the inwardly-facing portion of the overlapping front and rear portions, said flange and groove having a common radius of curvature concentric with said center of rotation.

25. A carrier according to claim 1 wherein said first and second hinge elements and said latch comprise a resilient compressible plastic material so as to afford releasable engagement of said upper coupling bar with said left and right side wall members.

26. A carrier according to claim 1, said bottom coupling bar comprises longitudinal skids formed by portions at both ends which are relatively thicker than the central portion.

* * * * *

UNITED STATES PATENT AND TRADEMARK OFFICE
CERTIFICATE OF CORRECTION

PATENT NO. : 4,833,876

DATED : May 30, 1989

INVENTOR(S) : Nobuo Kitao; Yoshimasa Shimomura

It is certified that error appears in the above-identified patent and that said Letters Patent is hereby corrected as shown below:

Col. 5, line 34, "flexingblocking" should be --flexing-blocking--;

Col. 7, line 15, after "36a" delete "a";

line 50, "26" should be --26'--;

Col. 8, line 40, "gagebbeyond" should be --gage beyond--;

Col. 14, line 63, after "and" delete "like".

Signed and Sealed this

Sixteenth Day of January, 1990

*Attest:*

JEFFREY M. SAMUELS

*Attesting Officer*     *Acting Commissioner of Patents and Trademarks*